(12) United States Patent
Choo et al.

(10) Patent No.: US 8,951,660 B2
(45) Date of Patent: *Feb. 10, 2015

(54) BATTERY PACK HAVING REINFORCEMENT MEMBER

(71) Applicant: LG Chem, Ltd., Seoul (KR)

(72) Inventors: Yeonseok Choo, Daejeon (KR); Chae Ho Chung, Daejeon (KR); Ye Hoon Im, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,105

(22) Filed: Aug. 23, 2013

(65) Prior Publication Data

US 2013/0341107 A1 Dec. 26, 2013

Related U.S. Application Data

(63) Continuation of application No. 13/577,057, filed as application No. PCT/KR2011/000613 on Jan. 28, 2011.

(30) Foreign Application Priority Data

Feb. 4, 2010 (KR) .......................... 10-2010-0010652

(51) Int. Cl.
*H01M 6/46* (2006.01)
*H01M 6/48* (2006.01)
*B60K 1/00* (2006.01)
(Continued)

(52) U.S. Cl.
CPC ............... *B60K 1/04* (2013.01); *H01M 2/1077* (2013.01); *H01M 2/1083* (2013.01); *B60L 11/1877* (2013.01); *H01M 2/347* (2013.01); *Y02T 10/7005* (2013.01); *Y02T 10/705* (2013.01); *Y02E 60/12* (2013.01)
USPC .......................................... 429/152; 180/65.1

(58) Field of Classification Search
CPC ....... H01M 2/1005; H01M 2/10; H01M 6/46; H01M 6/48; B60K 1/00
USPC ................... 429/163–187, 99–100; 180/65.1
See application file for complete search history.

(56) References Cited

U.S. PATENT DOCUMENTS 6,479,187 B1 11/2002 Takasaki et al.
7,128,999 B1 * 10/2006 Martin et al. ................... 429/99
(Continued)

FOREIGN PATENT DOCUMENTS

JP 2000-340195 A 12/2000
JP 2004-130910 A 4/2004
(Continued)

OTHER PUBLICATIONS

International Search Report issued PCT/KR2011/000613, mailed on Sep. 19, 2011.

*Primary Examiner* — Patrick Ryan
*Assistant Examiner* — Kiran Quraishi
(74) *Attorney, Agent, or Firm* — Birch, Stewart, Kolasch & Birch, LLP

(57) ABSTRACT

Disclosed is a battery pack including a battery module array, wherein a reinforcement member is coupled to side walls of end plates or sides of main members at an outer side of an outermost battery module of the battery module array to minimize deformation of the battery pack when the battery pack is vibrated in the front and rear direction.

19 Claims, 10 Drawing Sheets

(51) Int. Cl.
 *B60K 1/04* (2006.01)
 *H01M 2/10* (2006.01)
 *B60L 11/18* (2006.01)
 *H01M 2/34* (2006.01)

(56) References Cited

U.S. PATENT DOCUMENTS

| | | |
|---|---|---|
| 2007/0134524 A1 | 6/2007 | Cho et al. |
| 2009/0239136 A1 | 9/2009 | Nagamine et al. |
| 2010/0000816 A1 | 1/2010 | Okada |
| 2011/0020677 A1* | 1/2011 | Shin et al. ............... 429/71 |
| 2012/0328925 A1* | 12/2012 | Choo et al. ............... 429/99 |

FOREIGN PATENT DOCUMENTS

| | | | |
|---|---|---|---|
| JP | 2007-165286 A | 6/2007 | |
| JP | 2009-238643 A | 10/2009 | |
| KR | 10-2007-0080861 A | 8/2007 | |
| KR | 10-2007-0091387 A | 9/2007 | |
| KR | 10-2007-0112490 A | 11/2007 | |
| WO | WO 2009002096 A1 * | 12/2008 | ........ H01M 10/50 |

\* cited by examiner

BATTERY PACK HAVING REINFORCEMENT MEMBER

This application is a Continuation of application Ser. No. 13/577,057, filed Sep. 7, 2012, which is a National Phase of PCT International Application No. PCT/KR2011/000613 filed on Jan. 28, 2011, and which claims priority to Patent Application No. 10-2010-0010652, filed in the Republic of Korea on Feb. 4, 2010. The entire contents of all of the above applications are hereby incorporated by reference.

TECHNICAL FIELD

The present invention relates to a battery pack having a reinforcement member, and, more particularly, to a battery pack including a battery module array having battery modules which are arranged in the lateral direction in two or more rows, a base plate on which the battery modules are stacked in a vertically erected state, a pair of main members provided at the front and rear of the battery module array to support load of the battery modules, opposite ends of each of the main members being fastened to an external device, a pair of end plates disposed in tight contact with the front and rear of the battery module array in a state in which the lower end of each of the end plates is fixed to the base plate, and supporting bars connected between upper parts or side parts of the end plates so as to interconnect and support the end plates, wherein a reinforcement member is coupled to side walls of the end plates or sides of the main members at the outer side of an outermost battery module of the battery module array to minimize deformation of the battery pack when the battery pack is vibrated in the front and rear direction.

BACKGROUND ART

One of the biggest problems caused by vehicles using fossil fuel, such as gasoline and diesel oil, is the creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some electric vehicles and hybrid electric vehicles are now being commercially used. A nickel-metal hydride (Ni-MH) secondary battery has been mainly used as the power source for electric vehicles (EV) and hybrid electric vehicles (HEV). In recent years, however, the use of a lithium-ion battery has been attempted.

High power and capacity are needed for such a secondary battery to be used as the power source for the electric vehicles (EV) and the hybrid electric vehicles (HEV). To this end, a plurality of small-sized secondary batteries (unit cells) is connected in series to each other so as to form a battery module and a battery pack. According to circumstances, a plurality of small-sized secondary batteries (unit cells) is connected in series and in parallel to each other so as to form a battery module and a battery pack.

Generally, such a battery pack has a structure to protect battery modules, each of which has secondary batteries mounted therein. The structure of the battery module may be varied based on the kind of vehicles or installation position of the battery pack in the vehicles. One of the structures to effectively fix high-capacity battery modules is based on supporting bars and end plates. This structure is advantageous in that movement of the battery modules is minimized even when load is applied toward the supporting bars. To this end, however, it is necessary to sufficiently secure rigidity of the supporting bars and end plates.

In connection with this case, FIG. 1 is a perspective view illustratively showing a conventional battery pack including a single battery module.

Referring to FIG. 1, a battery pack 100 includes unit modules 10, each of which has secondary batteries mounted therein, a base plate 20, a pair of end plates 30, and supporting bars 40.

The unit modules 10 are stacked at the top of the base plate 20 in a state in which the unit modules 10 are vertically erected. The end plates 30 are disposed in tight contact with the outer sides of the outermost unit modules 10 in a state in which the lower end of each of the end plates 30 is fixed to the base plate 20.

The supporting bars 40 are connected between the upper parts of the end plates 30 so as to interconnect and support the end plates 30.

However, the battery pack with the above-stated construction does not include a structure to support the battery pack in the front and rear direction of the battery pack when external force is applied to the battery pack in the front and rear direction of the battery pack with the result that it is not possible to prevent deformation of the battery pack.

Also, the battery pack with the above-stated construction uses only a single battery module with the result that the capacity of the battery pack is low. For this reason, it is difficult for the battery pack with the above-stated construction to be applied to an external device, such as a vehicle, which needs a high power and capacity battery pack.

Meanwhile, battery packs for hybrid electric vehicles are configured in various forms based on the kind of vehicles or installation position of the battery pack in the vehicles so as to stably protect a battery cell array. Among such battery packs is a battery pack having a bucket structure, which is installed in the lower part of a trunk of a vehicle or in a depressed space defined between the lower end of a rear seat and the trunk of the vehicle.

In this case, the battery pack is located below the place at which the battery pack is fastened to the chassis of the vehicle. Consequently, it is necessary to provide a structure in which the battery pack is supported by main members and a base plate, and end plates and supporting bars are located at the front and rear of the battery pack so as to prevent the battery pack from being deformed in the front and rear direction. In this structure, the main members are bent in the shape of a bucket, and therefore, the overall structural stability of the battery pack is decided depending upon rigidity of the main members.

The rigidity of the main members may be improved by sufficiently increasing the depth of a flange or the thickness of each of the main members. However, it is not possible to sufficiently increase the depth of the flange due to the limited installation space in the vehicle. Also, increasing the thickness of each of the main members increases load of the battery pack. As a result, it is not possible to improve the structural stability of the battery pack.

Therefore, there is a high necessity for a battery pack configured to have a structure in which battery modules are located below the place at which the battery pack is fastened to the chassis of a vehicle, main members to support load of the battery pack have a bucket form, and the battery modules are arranged on a base plate in two rows, whereby structural stability of the battery pack is improved while the depth of a flange and the thickness of each of the main members are maintained, and deformation of the battery pack is minimized when external force is applied to the battery pack in the front and rear direction.

DISCLOSURE

Technical Problem

Therefore, the present invention has been made to solve the above problems, and other technical problems that have yet to be resolved.

Specifically, it is an object of the present invention to provide a battery pack including a battery module array having battery modules which are arranged in the lateral direction in two or more rows, a base plate, main members, end plates, and supporting bars, wherein a reinforcement member is coupled to side walls of the end plates or sides of the main members at the outer side of an outermost battery module of the battery module array to minimize deformation of the battery pack when the battery pack is vibrated in the front and rear direction.

It is another object of the present invention to provide a battery pack configured to have a structure in which a portion of the battery pack is formed using a portion of a vehicle so that the battery pack can be stably installed in the vehicle and the volume occupied by the battery pack in the vehicle can be minimized.

Technical Solution

In accordance with one aspect of the present invention, the above and other objects can be accomplished by the provision of a battery pack including a battery module array having battery modules which are arranged in the lateral direction in two or more rows, each of the battery modules being configured to have a structure in which battery cells or unit modules, each of which has two or more battery cells mounted therein, stacked in a state in which the battery cells or the unit modules are vertically erected, a base plate on which the battery modules are stacked in a vertically erected state, a pair of main members provided at the front and rear of the battery module array to support load of the battery modules, opposite ends of each of the main members being fastened to an external device, a pair of end plates disposed in tight contact with the front and rear of the battery module array in a state in which the lower end of each of the end plates is fixed to the base plate, and supporting bars connected between upper parts or side parts of the end plates so as to interconnect and support the end plates, wherein a reinforcement member is coupled to side walls of the end plates or sides of the main members at the outer side of an outermost battery module of the battery module array to minimize deformation of the battery pack when the battery pack is vibrated in the front and rear direction.

In the battery pack according to the present invention, the reinforcement member is coupled to the side walls of the end plates or the sides of the main members. Consequently, it is possible to prevent deformation of the battery pack when the battery pack is vibrated in the front and rear direction.

Also, the opposite ends of each of the main members are fastened to an external device. Even when the battery pack is located below the place at which the battery pack is fastened to the external device, therefore, it is possible to easily mount the battery pack to the external device.

In addition, the battery modules, in which the unit modules are stacked in a state in which the unit modules are vertically erected, are arranged in the lateral direction in two or more rows. Consequently, it is possible for the battery pack according to the present invention to provide higher power and capacity than a conventional battery pack including a single battery module.

In the present invention, each of the unit modules may be a secondary battery or a small-sized module having two or more secondary batteries mounted therein. An example of a unit module having two or more secondary batteries mounted therein is disclosed in Korean Patent Application No. 2006-12303, which has been filed in the name of the applicant of the present application. In the disclosure of this patent application, the unit module is configured to have a structure in which two secondary batteries are mounted to a frame member having input and output terminals in a state in which the secondary batteries are in tight contact with each other.

Another example of the unit module is disclosed in Korean Patent Application No. 2006-20772 and No. 2006-45444, which have also been filed in the name of the applicant of the present application. In the disclosure of each of these patent applications, the unit module is configured to have a structure in which outer sides of two secondary batteries are covered with a pair of high-strength cell covers in a state in which the secondary batteries are in tight contact with each other.

The disclosures of the above patent applications are incorporated herein by reference. Of course, however, the structure of each of the unit modules of the battery module according to the present invention is not limited to the above examples of the unit modules disclosed in the above patent applications.

Preferably, each of the battery cells is a plate-shaped battery cell, which provides a high stack rate in a limited space. For example, each of the battery cells may be configured to have a structure in which an electrode assembly is mounted in a battery case formed of a laminate sheet.

Specifically, each of the battery cells is a pouch-shaped secondary battery in which an electrode assembly of a cathode/separator/anode structure is disposed in a battery case together with an electrolyte in a sealed state. For example, each of the battery cells may be a plate-shaped secondary battery configured in an approximately hexahedral structure having a small thickness to width ratio. Generally, the pouch-shaped secondary battery includes a pouch-shaped battery case. The battery case is configured to have a laminate sheet structure in which an outer coating layer formed of a polymer resin exhibiting high durability, a barrier layer formed of a metal material blocking moisture or air, and an inner sealant layer formed of a polymer resin that can be thermally welded are sequentially stacked.

The structure of each of the main members is not particularly restricted so long as each of the main members can easily support load of the battery modules. Preferably, each of the main members is configured to have an approximately U-shaped frame structure surrounding opposite sides and the bottom of the battery module array.

Consequently, the opposite sides of each of the main members are connected to a corresponding one of the end plates with the result that the interior of the U-shaped frame structure is full, and therefore, bending rigidity of each of the main members against vertical vibration is greatly improved.

In a preferred example of the above-described structure, upper ends of each of the main members may be bent outward so that the battery pack can be easily mounted to an external device, and the bent portions of each of the main members may be provided with fastening holes. Consequently, coupling between the main members and the external device is securely achieved.

The structure of the reinforcement member is not particularly restricted so long as the reinforcement member can prevent deformation of the battery pack when external force is applied to the battery pack in the front and rear direction. For example, the reinforcement member may be formed in the shape of a plate or bar and may be disposed at the outer side of the outermost battery module in a diagonal structure or in an X-shaped structure on a plane.

Specifically, the side shape of each of the main members may be deformed from a rectangular shape to a parallelogram when the battery pack is deformed in the front and rear direction. In the diagonal structure, therefore, each of the main members is constrained in the diagonal direction in a state in which the side shape of each of the main members is maintained in the rectangular shape, thereby increasing resistance against deformation of the battery pack in the front and rear direction.

Also, in the X-shaped structure, it is possible to greatly improve resistance against deformation of the battery pack in the front and rear direction as compared with the diagonal structure.

The reinforcement member may be coupled to the side walls of the end plates or the sides of the main members by welding or bolting as needed.

According to circumstances, the reinforcement member may be further coupled to tops of the end plates by welding or bolting so that the reinforcement member is disposed in a diagonal structure or in an X-shaped structure on a plane, thereby more effectively preventing deformation of the battery pack when the battery pack is vibrated in the up and down direction and in the front and rear direction.

Meanwhile, each of the end plates may be formed in the shape of a single body having a size corresponding to the front or rear of the battery module array to minimize deformation of the battery pack when the battery pack is vibrated in the up and down direction.

In such a structure in which each of the end plates has a size corresponding to the front or rear of the battery module array as described above, it is possible to reliably improve bending rigidity of the main members and to sufficiently secure overall structural stability of the battery pack when the battery pack is vibrated in the up and down direction.

Each of the end plates may be configured to disperse pressure (bending load) from the battery modules and the supporting bars. Preferably, each of the end plates includes a body part disposed in contact with the battery module array, an upper end wall, a lower end wall, and a pair of side walls, the upper end wall, the lower end wall, and the side walls protruding outward from the perimeter of the body part. Here, "outward direction" means a direction opposite to the pressure, i.e. a direction opposite a direction in which the battery modules and the supporting bars are located about the body part of each of the end plates.

In the battery pack according to the present invention, therefore, the battery modules, which are stacked on the base plate, are brought into tight contact with each other by the end plates, and the end plates are fixed by the supporting bars. Consequently, it is possible to prevent the unit modules constituting each of the battery modules from moving in the thickness direction thereof and swelling, thereby improving safety of the battery modules and effectively preventing deterioration in performance of the battery modules.

In a preferred example of the above-described structure, the lower end wall of each of the end plates may be coupled to the lower end of the base plate and the lower end of each of the main members by welding or bolting.

In a case in which the lower end wall of each of the end plates is coupled to the lower end of the base plate and the lower end of each of the main members by welding or bolting, the welding or the bolting is preferably carried out at four or more spots, thereby achieving secure coupling therebetween.

In another example, each of the side walls of each of the end plates may also be coupled to each side of each of the main members by welding or bolting.

In a case in which each of the side walls of each of the end plates is coupled to each side of each of the main members by welding or bolting, the welding or bolting may be carried out at one or more spots. In particular, coupling between the end plates and the main members is improved when the welding or the bolting is carried out at three or more spots in consideration of modes in which the main members are deformed.

Meanwhile, the supporting bars may interconnect the upper parts and/or the side parts of the end plates.

In a structure in which the supporting bars interconnect the upper parts of the end plates, the upper end wall of each of the end plates may protrude upward from the top of the battery module array so that the supporting bars can be easily mounted to the end plates. In this structure, the supporting bars may be coupled to the end plates in a state in which the supporting bars are located above the battery modules.

The upwardly protruding height of the upper end wall may be equivalent to 2 to 20% of the height of the battery module array. If the upwardly protruding height of the upper end wall is less than 2% of the height of the battery module array, it is difficult to mount the supporting bars to the end plates. Alternatively, supporting bars having a corresponding size may be used. In this case, however, overall rigidity of the battery pack is lowered. On the other hand, if the upwardly protruding height of the upper end wall is greater than 20% of the height of the battery module array, the volume of the battery pack is excessively increased, which is not preferable.

Since the lower end walls of the end plates are fixedly coupled to the base plate, the end plates are prevented from being separated from the base plate when external impact is applied to the end plates.

For example, a pair of fastening holes may be formed at a portion of the lower end wall of each of the end plates, and bolts may be inserted through the fastening holes so that the end plates can be fixed to the base plate. Alternatively, coupling between the end plates and the base plate may be achieved by welding.

Meanwhile, the size of each of the end plates is not particularly restricted so long as each of the end plates has a size corresponding to the front or rear of the battery module array. For example, each of the end plates may be formed in the planar shape of a rectangle.

Preferably, each of the end plates is provided at the upper part thereof with through holes, in which the supporting bars are mounted. The supporting bars are inserted through the through holes, thereby easily achieving coupling between the end plates and the supporting bars.

In accordance with another aspect of the present invention, there is provided a device such as an electric vehicle, hybrid electric vehicle, or plug-in hybrid electric vehicle using the battery pack with the above-stated construction as a power source, having a limited installation space, and exposed to frequent vibration and strong impact.

Of course, the battery pack used as the power source of the vehicle may be combined and manufactured based on desired power and capacity.

In this case, the vehicle may be an electric vehicle, hybrid electric vehicle, or plug-in hybrid electric vehicle wherein the battery pack is installed in the lower end of a trunk of the vehicle or between a rear seat and the trunk of the vehicle.

The electric vehicle, hybrid electric vehicle, or plug-in hybrid electric vehicle using the battery pack as the power source thereof are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
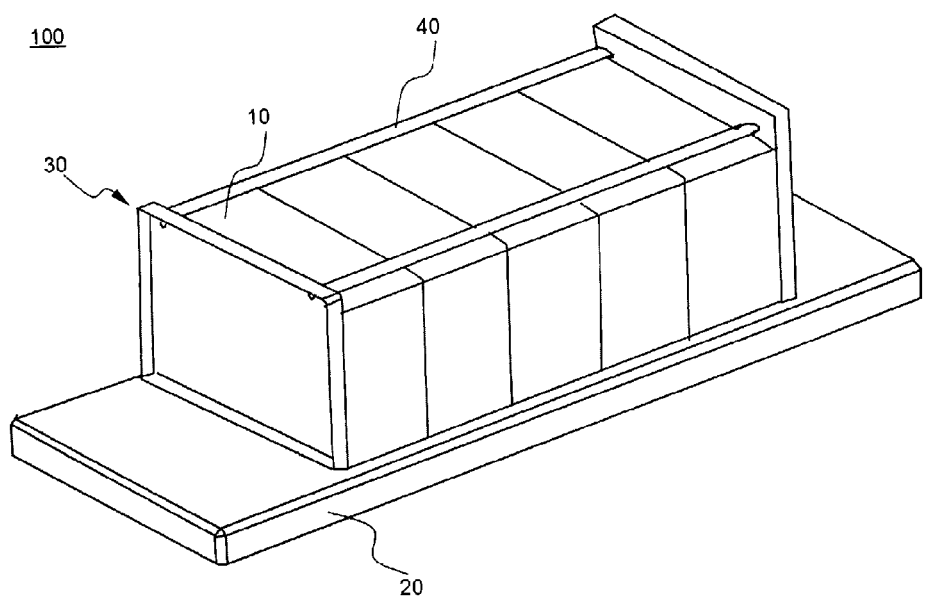
FIG. 1 is a perspective view showing a conventional battery pack.
Figure 2:
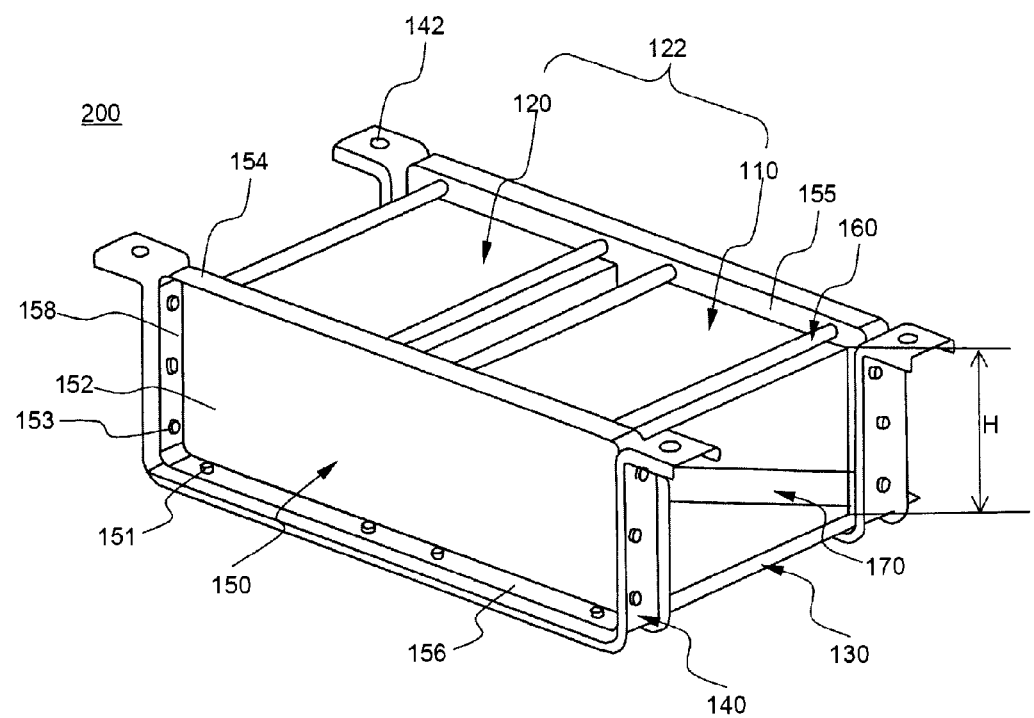
FIG. 2 is a perspective view showing a battery pack according to an embodiment of the present invention.

FIG. 2 is a perspective view typically showing a battery pack according to an embodiment of the present invention.

Referring to FIG. 2, a battery pack 200 includes a battery module array 122 including battery modules 110 and 120 which are arranged in the lateral direction in two rows, a base plate 130, a pair of main members 140, a pair of end plates 150, and a plurality of supporting bars 160.

The battery modules 110 and 120 are stacked on the top of the base plate 130 in a state in which the battery modules 110 and 120 are vertically erected. The end plates 150 are disposed in tight contact with the front and rear of the a battery module array 122 in a state in which the lower ends of the end plates 150 are fixed to the base plate 130.

The main members 140 are provided at the front and rear of the battery module array 122 to support load of the battery modules 110 and 120. Opposite ends of each of the main members 140 are fastened to an external device (not shown).

Also, each of the main members 140 is configured to have a U-shaped frame structure surrounding opposite sides and the bottom of the battery module array 122. The upper ends of each of the main members 140 are bent outward. The bent portions of each of the main members 140 are provided with fastening holes 142, through which the battery pack 200 can be easily mounted to an external device.

The supporting bars 160 are connected between the upper parts of the end plates 150 so as to interconnect and support the end plates 150.

Also, a reinforcement member 170 is coupled to the side walls of the end plates 150 by welding so that the reinforcement member 170 is disposed at the outer side of the outermost battery module 110 in a diagonal structure on a plane to minimize deformation of the battery pack 200 when the battery pack 200 is vibrated in the front and rear direction.

According to circumstances, the reinforcement member 170 may be coupled to the side walls of the end plates 150 by bolting (not shown).

On the other hand, each of the end plates 150 is formed in the planar shape of a rectangle having a size corresponding to the front of the battery module array 122 to minimize deformation of the battery pack 200 when the battery pack 200 is vibrated in the up and down direction.

Also, each of the end plates 150 includes a body part 152 disposed in contact with the battery module array 122, an upper end wall 154, a lower end wall 156, and a pair of side walls 158. The upper end wall 154, the lower end wall 156, and the side walls 158 protrude outward from the perimeter of the body part 152.

The lower end wall 156 of each of the end plates 150 is coupled to the lower end of the base plate 130 and the lower end of each of the main members 140 at four spots 151 by spot welding. Each of the side walls 158 of each of the end plates 150 is coupled to each side of each of the main members 140 at three spots 153 by spot welding.

According to circumstances, the lower end wall 156 of each of the end plates 150 may be coupled to the lower end of the base plate 130 and the lower end of each of the main members 140 by bolting (not shown). In the same manner, each of the side walls 158 of each of the end plates 150 may be coupled to each side of each of the main members 140 by bolting (not shown).

In addition, the upper end wall 154 of each of the end plates 150 protrudes upward from the top of the battery module array 122 so that the upper end wall 154 of each of the end plates 150 is 10% higher than the height H of the battery module array 122. Consequently, the supporting bars 160 can be easily mounted to the upper parts 155 of the end plates 150.

The battery module 110 is configured to have a structure in which unit modules each including plate-shaped battery cells, each of which has an electrode assembly mounted in a battery case formed of a laminate sheet, are stacked in a state in which the unit modules are vertically erected.

Figure 3:
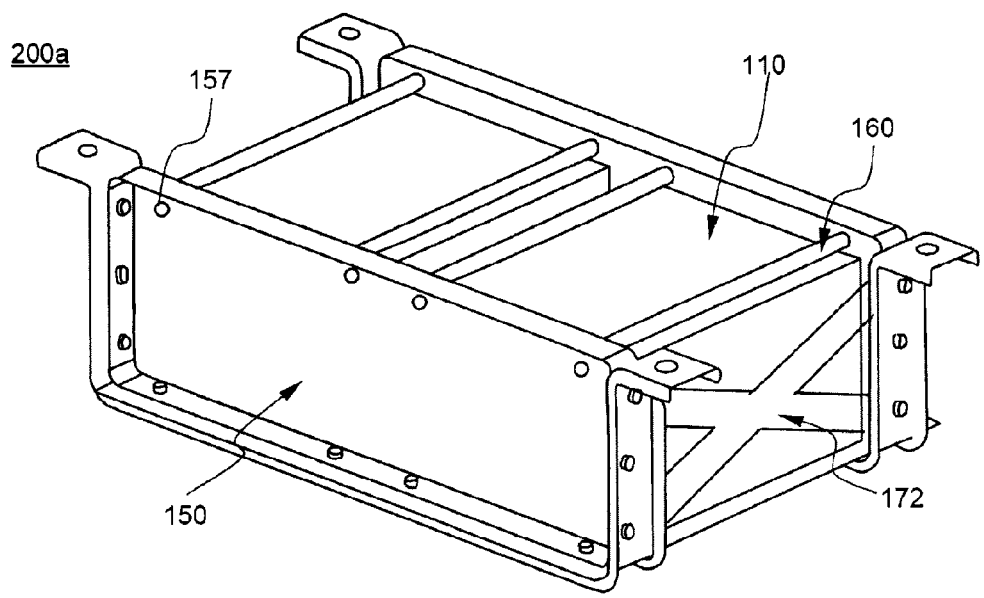
FIG. 3 is a perspective view showing a battery pack according to another embodiment of the present invention.

FIG. 3 is a perspective view typically showing a battery pack according to another embodiment of the present invention.

Referring to FIG. 3, a battery pack 200a of FIG. 3 is identical in structure to the battery pack 200 of FIG. 2 except that each of the end plates 150 is provided at the upper part thereof with through holes 157, in which the supporting bars 160 are mounted, and a reinforcement member 172 is coupled to the side walls of the end plates 150 by welding so that the reinforcement member 172 is disposed at the outer side of the outermost battery module 110 in an X-shaped structure on a plane, and therefore, a detailed description thereof will not be given.

Figure 4:
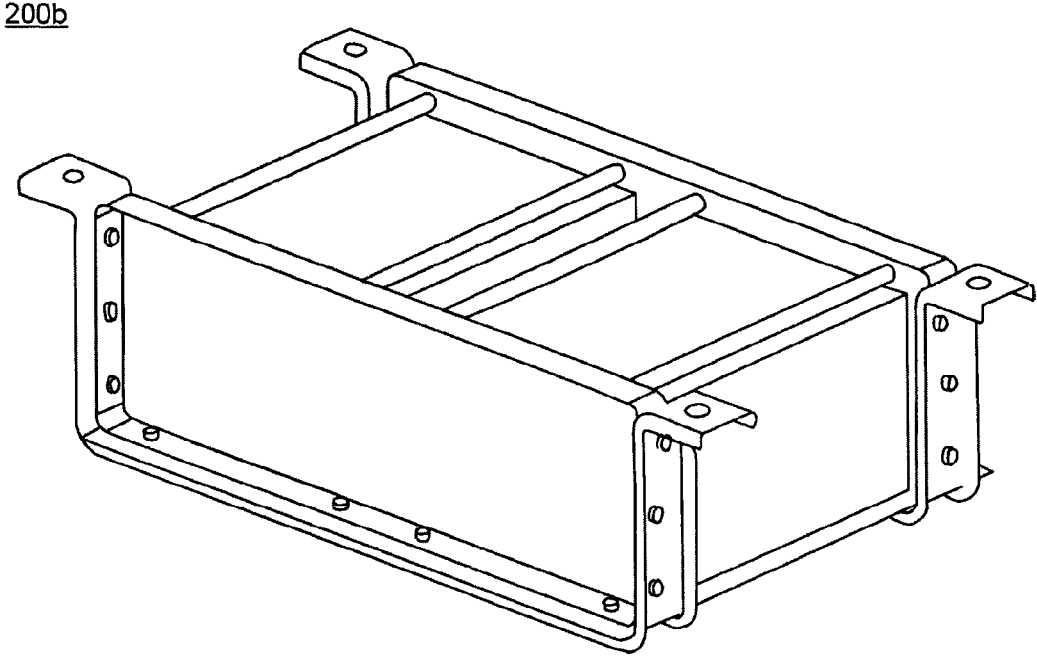
FIG. 4 is a perspective view showing the structure of a comparative battery pack in which no reinforcement member is mounted, which is compared with the structure of the battery pack according to the present invention shown in FIG. 2.

FIG. 4 is a perspective view typically showing the structure of a comparative battery pack in which no reinforcement member is mounted, which is compared with the structure of the battery pack according to the present invention shown in FIG. 2.

Referring to FIG. 4 together with FIG. 2, a battery pack 200b of FIG. 4 is identical in structure to the battery pack of FIG. 2 except that the reinforcement member 170 is not coupled to the side walls of the end plates 150 by welding so that the reinforcement member 170 is disposed at the outer side of the outermost battery module 110 in a diagonal structure on a plane.

Figure 5:
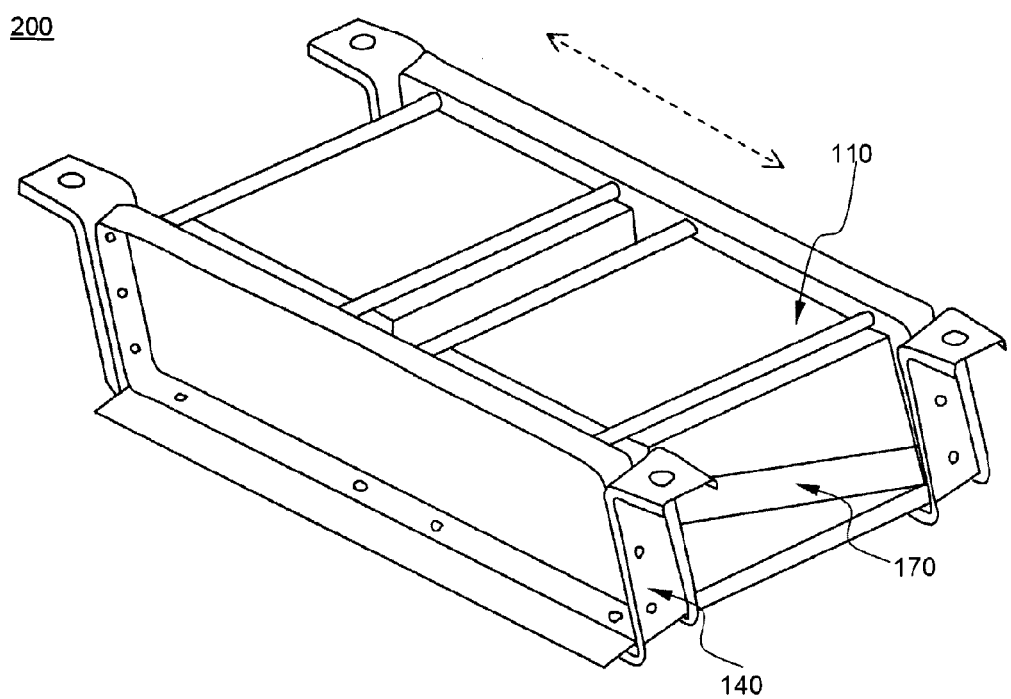
FIGS. 5 and 6 are perspective views showing variation when external force is applied to the battery packs shown in FIGS. 2 and 4 in the front and rear direction.
Figure 6:
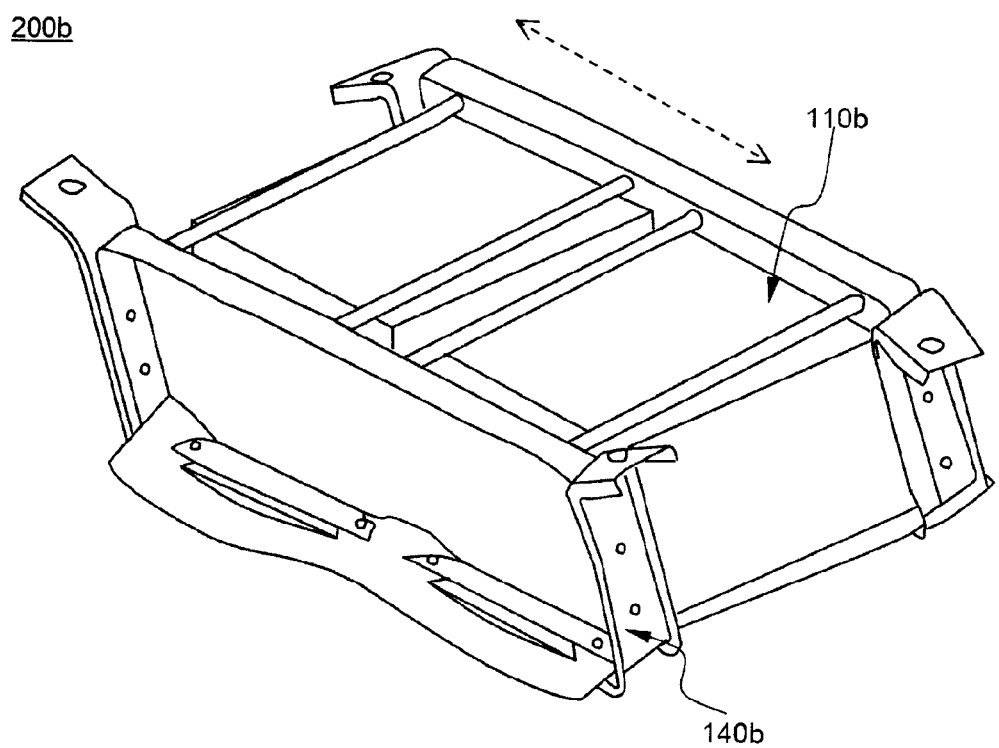

FIGS. 5 and 6 are perspective views typically showing variation when external force is applied to the battery packs shown in FIGS. 2 and 4 in the front and rear direction. Structures shown in FIGS. 5 and 6 and structures shown in FIGS. 7 and 8, which will be described below, are obtained by simulating variation when external force is applied to the battery packs.

Referring to these drawings, when external force is applied to the battery pack 200 of FIG. 2 in the front and rear direction (in a direction indicated by an arrow), deformation of the main members 140 and the battery module 110 is low since the reinforcement member 170 supports the main members 140. On the other hand, when external force is applied to the battery pack 200*b* of FIG. 4, deformation of the main members 140 and the battery module 110*b* is high in the front and rear direction, i.e. the direction in which the external force is applied to the battery pack 200*b*.

Figure 7:
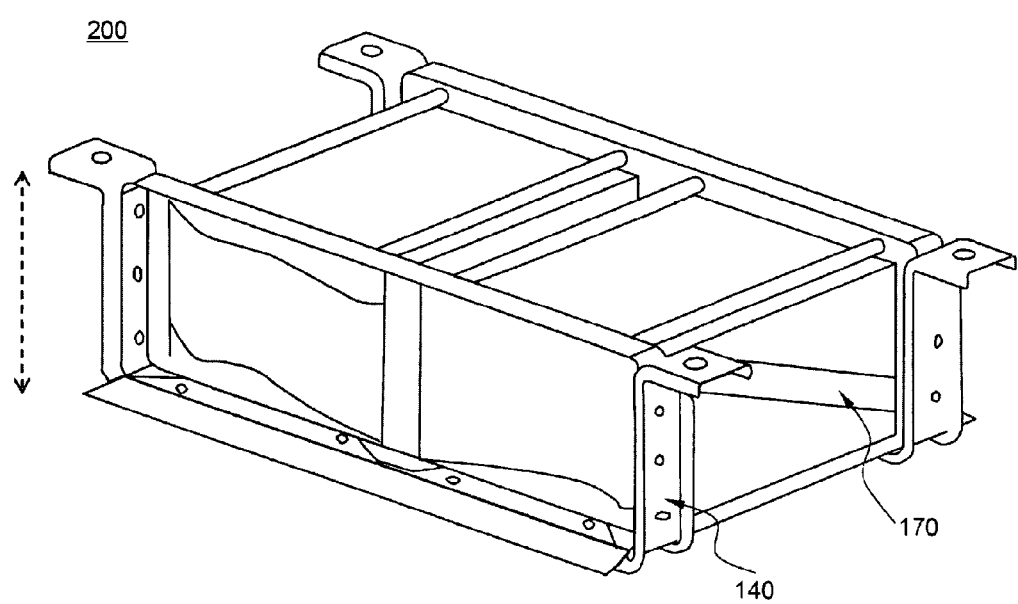
FIGS. 7 and 8 are perspective views showing variation when external force is applied to the battery packs shown in FIGS. 2 and 4 in the up and down direction.
Figure 8:
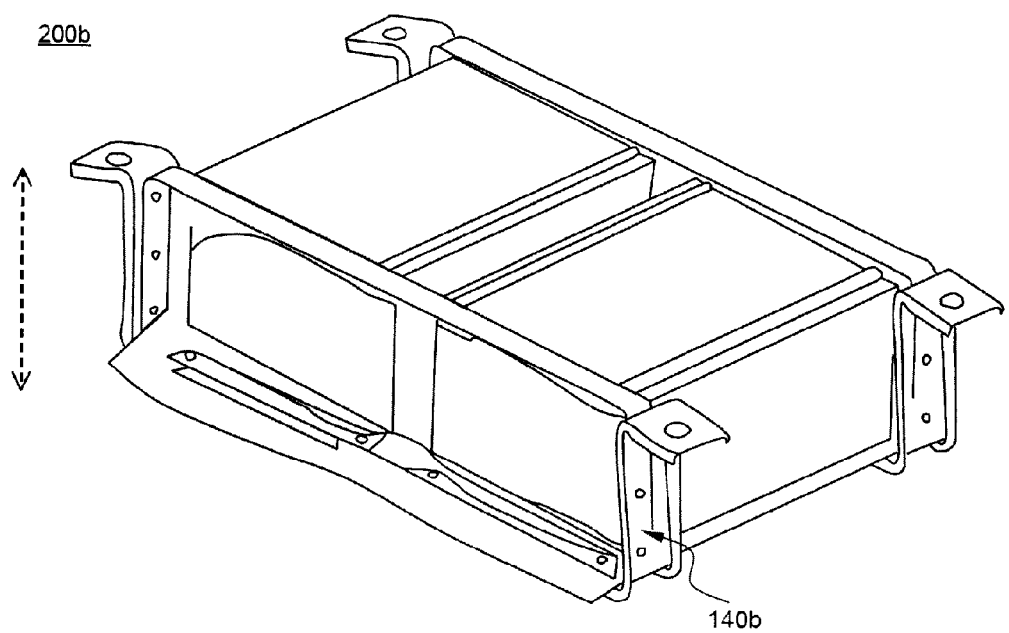

FIGS. 7 and 8 are perspective views typically showing variation when external force is applied to the battery packs shown in FIGS. 2 and 4 in the up and down direction.

Referring to these drawings, when external force is applied to the battery pack 200 of FIG. 2 in the up and down direction (in a direction indicated by an arrow), deformation of the main members 140 is low since the reinforcement member 170 supports the main members 140. On the other hand, when external force is applied to the battery pack 200*b* of FIG. 4, deformation of the main members 140*b* is high in the direction in which the external force is applied to the battery pack 200*b*.

Meanwhile, resonance point detection and analysis have been carried out in deformation modes when external force was applied to the battery packs in the front and rear direction and in the up and down direction so as to understand vibration properties of the battery pack structure shown in FIG. 2 and the battery pack structure shown in FIG. 4. The results of the resonance point detection and analysis are given in Table 1 below.

TABLE 1

| Deformation mode | Structure of battery pack | Resonance frequency |
| --- | --- | --- |
| Deformation mode in front and rear direction | Structure of FIG. 2 | 71.467 Hz |
| | Structure of FIG. 4 | 16.588 Hz |
| Deformation mode in up and down direction | Structure of FIG. 2 | 73.779 Hz |
| | Structure of FIG. 4 | 73.572 Hz |

As can be seen from Table 1 above, in each of the deformation modes, structural stability of the battery pack of FIG. 2 is improved as compared with that of the battery pack of FIG. 4 even when the battery pack is strongly vibrated in the up and down direction or in the front and rear direction since the battery pack of FIG. 2 is configured to have a structure in which the reinforcement member is coupled to the side walls of the end plates by welding. In particular, the structural stability of the battery pack is higher when the battery pack is vibrated in the front and rear direction.

Consequently, it is possible to minimize variation of the main members in the front and rear direction by simply fixing the reinforcement member to the side walls of the end plates, which is an unexpected result.

Particularly, in the battery pack according to the present invention, the reinforcement members are coupled to the side walls of the end plates by welding at the outer side of the outermost battery module of the battery module array. Consequently, the present invention can be applied to a vehicle in which the weight of the battery pack is 30 Kg or more, and the main members of the battery pack poorly tolerate vibration in the front and rear direction.

Figure 9:
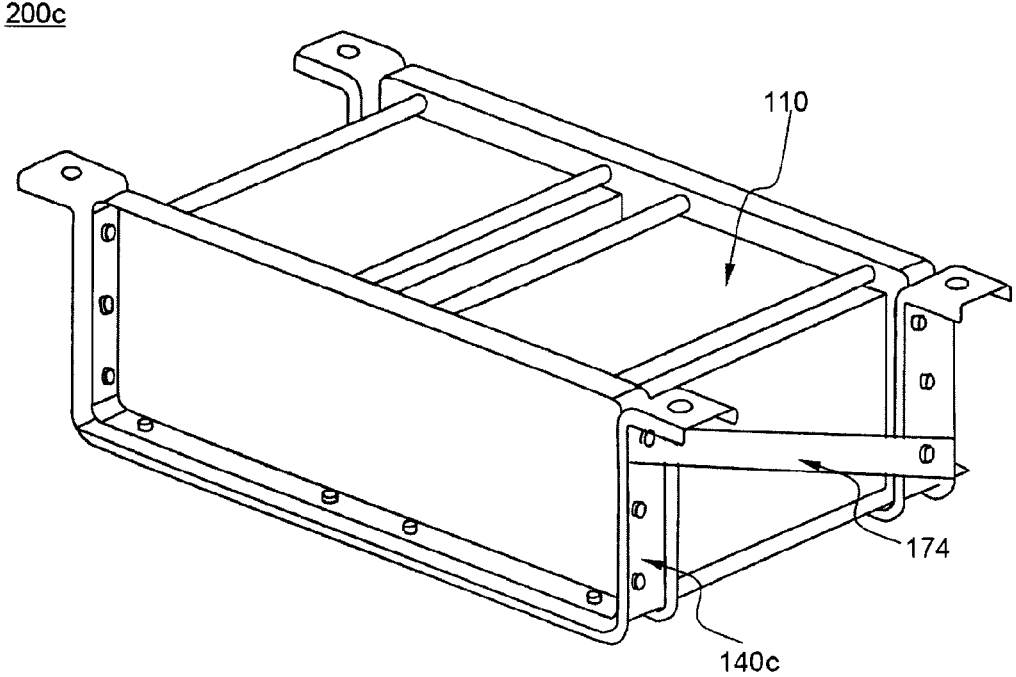
FIGS. 9 and 10 are perspective views showing battery packs according to other embodiments of the present invention.
Figure 10:
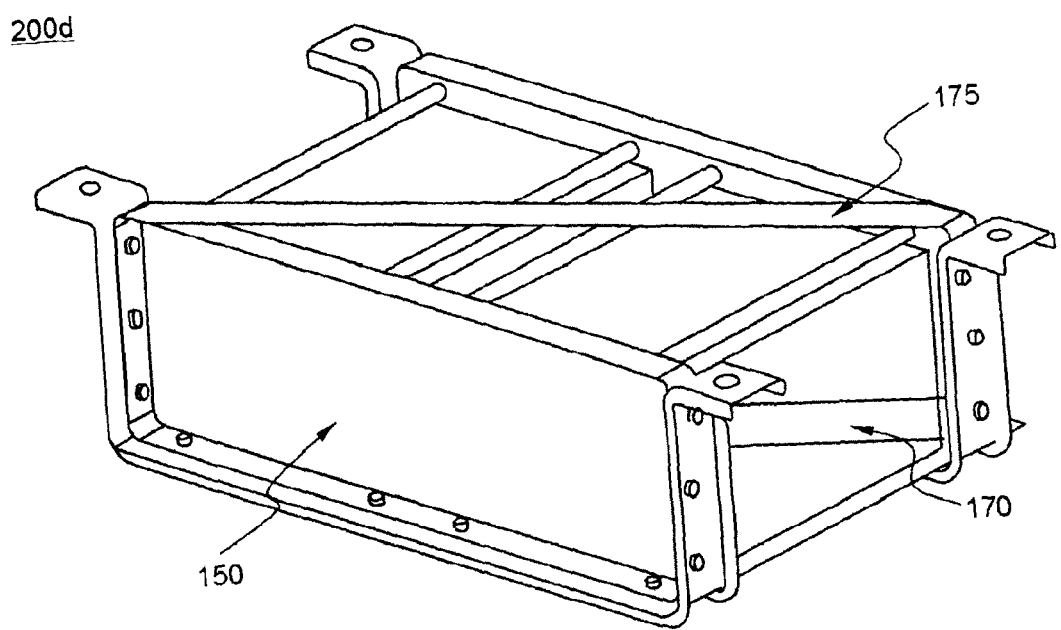

FIGS. 9 and 10 are perspective views showing battery packs according to other embodiments of the present invention.

Referring to these drawings, a battery pack 200*c* of FIG. 9 is identical in structure to the battery pack 200 of FIG. 2 except that a reinforcement member 174 is coupled to sides of main members 140*c* by welding so that the reinforcement member 174 is disposed at the outer side of the outermost battery module 110 in a diagonal structure on a plane, and a battery pack 200*d* of FIG. 10 is identical in structure to the battery pack 200 of FIG. 2 except that a reinforcement member 175 is further coupled to tops of the end plates 150 by welding so that the reinforcement member 174 is disposed in a diagonal structure on a plane, and therefore, a detailed description thereof will not be given.

INDUSTRIAL APPLICABILITY

As is apparent from the above description, the battery pack according to the present invention is configured to have a structure in which the battery modules are arranged in the lateral direction in two or more rows. Consequently, it is possible for the battery pack according to the present invention to provide higher power and capacity than a conventional battery pack including a single battery module.

Also, the battery pack according to the present invention is configured to have a structure in which the reinforcement member is coupled to the side walls of the end plates or the sides of the main members at the outer side of the outermost battery module of the battery module array. Consequently, it is possible to minimize deformation of the battery pack when the battery pack is vibrated in the front and rear direction.

In addition, a portion of the battery pack is configured using a portion of a vehicle. Consequently, it is possible to stably install the battery pack in the vehicle and to minimize the volume occupied by the battery pack in the vehicle.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising:
   a battery module array having battery modules which are arranged in a lateral direction in two or more rows, each of the battery modules being configured to have a structure in which battery cells or unit modules, each of which has two or more battery cells mounted therein, are stacked in which the battery cells or the unit modules are vertically erected;
   a base plate on which the battery modules are stacked in a vertically erected state;
   a pair of main members provided at a front and rear of the battery module array to support load of the battery modules, opposite ends of each of the main members being fastened to an external device;
   a pair of end plates disposed in tight contact with the front and rear of the battery module array in a state in which a lower end of each of the end plates is fixed to the base plate; and
   supporting bars connected between upper parts or side parts of the end plates so as to interconnect and support the end plates, wherein a reinforcement member is coupled to side walls of the end plates or sides of the main members at an outer side of an outermost battery module of the battery module array to minimize deformation of the battery pack when the battery pack is vibrated in a front and rear direction, and wherein the reinforcement member is disposed at the outer side of the outermost battery module in a diagonal structure or in an X-shaped structure in a plane.

2. The battery pack according to claim 1, wherein each of the battery cells is a plate-shaped battery cell.

3. The battery pack according to claim 2, wherein each of the battery cells is configured to have a structure in which an electrode assembly is mounted in a battery case formed of a laminate sheet.

4. The battery pack according to claim 1, wherein each of the main members is configured to have a U-shaped frame structure surrounding opposite sides and a bottom of the battery module array.

5. The battery pack according to claim 4, wherein upper ends of each of the main members are bent outward so that the battery pack can be easily mounted to an external device, and the bent portions of each of the main members are provided with fastening holes.

6. The battery pack according to claim 1, wherein the reinforcement member is coupled to the side walls of the end plates or the sides of the main members by welding or bolting.

7. The battery pack according to claim 1, wherein the reinforcement member is further coupled to tops of the end plates by welding or bolting so that the reinforcement member is disposed in the diagonal structure or in the X-shaped structure in a plane.

8. The battery pack according to claim 1, wherein each of the end plates is formed in the shape of a single body having a size corresponding to the front or rear of the battery module array to minimize deformation of the battery pack when the battery pack is vibrated in an up and down direction.

9. The battery pack according to claim 1, wherein each of the end plates comprises a body part disposed in contact with the battery module array, an upper end wall, a lower end wall, and a pair of side walls, the upper end wall, the lower end wall, and the side walls protruding outward from a perimeter of the body part.

10. The battery pack according to claim 9, wherein the lower end wall of each of the end plates is coupled to a lower end of the base plate and a lower end of each of the main members by welding or bolting.

11. The battery pack according to claim 10, wherein the welding or the bolting is carried out at four or more spots.

12. The battery pack according to claim 9, wherein each of the side walls of each of the end plates is coupled to each side of each of the main members by welding or bolting.

13. The battery pack according to claim 12, wherein the welding or the bolting is carried out at one or more spots.

14. The battery pack according to claim 9, wherein the upper end wall of each of the end plates protrudes upward from a top of the battery module array so that the supporting bars can be easily mounted to the end plates.

15. The battery pack according to claim 14, wherein the upwardly protruding height is equivalent to 2 to 20% of a height of the battery module array.

16. The battery pack according to claim 1, wherein each of the end plates is formed in the planar shape of a rectangle.

17. The battery pack according to claim 1, wherein each of the end plates is provided at an upper part thereof with through holes, in which the supporting bars are mounted.

18. A device such as an electric vehicle, hybrid electric vehicle or plug-in hybrid electric vehicle using the battery pack according to claim 1 as a power source.

19. The device according to claim 18, wherein the battery pack is installed in a lower end of a trunk of the vehicle or between a rear seat and the trunk of the vehicle.

* * * * *